United States Patent [19]

Williamson

[11] Patent Number: 4,555,259
[45] Date of Patent: Nov. 26, 1985

[54] COMPONENT

[75] Inventor: Terence J. Williamson, Leeds, England

[73] Assignee: Burwell, Reed & Kinghorn Limited, West Yorkshire, England

[21] Appl. No.: 447,162

[22] Filed: Dec. 6, 1982

[30] Foreign Application Priority Data

Dec. 7, 1981 [GB] United Kingdom ................. 8136808
Jun. 3, 1982 [GB] United Kingdom ................. 8216153

[51] Int. Cl.$^4$ ...................... C03B 11/06; B22D 11/126
[52] U.S. Cl. ................................ 65/374.12; 29/527.6; 164/98; 164/99; 164/111; 425/525
[58] Field of Search ................. 29/527.7, 527.6, 527.5; 65/374.12; 425/522, 523, 525; 164/91, 93, 95, 98, 99, 111, 100, 101, 102

[56] References Cited

U.S. PATENT DOCUMENTS

| 715,584 | 12/1902 | Kent | 29/527.7 |
| 1,107,755 | 8/1914 | Canda | 29/527.7 |
| 1,926,320 | 9/1933 | Trembour | 29/527.7 |
| 2,995,816 | 8/1961 | Ma | 29/527.7 X |
| 3,829,300 | 8/1974 | Shealy | 65/374.12 |
| 3,933,484 | 1/1976 | Costin | 65/374.12 |
| 3,980,473 | 9/1976 | Costin | 65/374.12 |
| 3,984,240 | 10/1976 | Costin | 65/374.12 |
| 4,218,243 | 8/1980 | Kiyonaga et al. | 65/374.12 |

FOREIGN PATENT DOCUMENTS 2377261 9/1978 France .............................. 65/374.12

Primary Examiner—Howard N. Goldberg
Assistant Examiner—Vernon K. Rising
Attorney, Agent, or Firm—Brooks & Kushman

[57] ABSTRACT

A component, for moulding glassware, is produced by forming a first mould, for moulding a first metal, placing an insert or inserts of a second, reinforcing metal within the first mould, casting the first metal in the first mould about the insert or inserts, and machining the casting to the desired final shape. The first metal may be cast iron, and the second metal may be a nickel cobalt alloy. The first moulds are designed so that the flow path of the first molten metal does not impinge directly on the second metal whereby the insert is prevented from being prematurely melted.

5 Claims, 10 Drawing Figures

COMPONENT

This invention relates to a mould component, for instance a mould for the production of glass holloware, and to a method of making the same.

Moulds and mould components for glass-ware, for example for glass bottles, are generally themselves produced by a casting process. The components are produced by first of all casting a suitable metal, usually iron, into the approximate shape required and then producing the finished component by machining the casting to the exact configuration desired. Where the components are actual moulds, they may be formed as interengaging halves which fit together to produce the complete mould which may be split apart after moulding to release the moulded article.

Many mould components for glass-ware, for example bottles and the like, are produced from cast iron but it has been found necessary to reinforce parts of the component for example in the area of the neck of the eventual bottle, for satisfactory performance. One common method of producing such a component is to produce a rough iron casting, machine to shape, produce a chamfer, annulus, or other depression where it is desired to have the reinforced area, deposition weld a harder alloy, for example a nickel-cobalt alloy, into the depression, and re-machine the mould to produce the finished article. In certain circumstances it is possible to deposition weld the nickel-cobalt alloy before the first machining step thereby saving a processing stage. However, these methods of producing a locally reinforced component are both time-consuming and expensive.

The invention seeks to provide a method of producing a reinforced component which is simpler and less expensive than hitherto known processes.

According to the present invention there is provided a component which comprises a casting of a first metal having inserts therein, in areas at which it is desired to provide reinforcement, the inserts being of a second, reinforcing metal, and the casting being machined to the desired final shape.

The invention also provides a method of producing such a component which comprises forming a first mould, placing an insert or inserts of the said second metal in the first mould, casting the first metal in the first mould about the insert, and machining the casting to the desired final shape.

The first metal may be any suitable casting metal but will for reasons of convenience and economy generally be cast iron. The first mould may be produced by any suitable moulding process for the first metal chosen. For example, with cast iron, the first mould may be produced by compacting a refractory mixture of particulate matter and forming a suitably shaped depression therein, as is well known in the art of casting iron. In the practice of the present invention the insert of the second metal is placed in the mould for the cast iron at this stage, positioned at the point where it will be required in the eventual component. For example, in a component which is intended to produce glass bottles, the area about the neck of the eventual bottle needs to be reinforced and an annulus of the second metal may then be placed in the cast iron mould in the appropriate position. The component is then formed in the normal way and the amount of machining required is substantially reduced. Furthermore, the process of the invention enables the deposition welding of the second metal to be dispensed with entirely.

It has been found that the first metal, in effect, welds within the first mould to the second metal insert forming a very strong continuous bond therewith.

It should be emphasised that the melting point of the metal or alloy from which the insert is formed will generally be below the temperature at which the first metal is cast. While it would be relatively easy to cast in place an insert having a higher melting point, the fact that it has a lower melting point would normally lead one to suppose that the operation could not be done successfully since the insert would melt, or at any rate distort. By carefully arranging the casting conditions in accordance with the invention the process can be successfully carried out.

During the casting process, the first metal steadily loses heat and drops in temperature. At the point of ingress into the first mould the temperature is highest, whereas at the furthest point the temperature is lowest. According to the preferred practice of the process of the invention the flow path of molten first metal is so arranged that it avoids direct contact with the inserts until the temperature has dropped to a point where it will not melt away the insert. Some fusing however of the insert is advantageous to lock the insert in place in the finished component.

In order to encourage the controlled fusing of the second metal to the first within the component the inserts may be provided with serrations, ridges, or the like. The extremities of such serrations or the like, having less metal and therefore smaller heat capacity, are much more easily heated by the molten first metal and fusing of the two is thereby encouraged. Furthermore, even where fusing is incomplete, the serrations form a mechanical bond which resists dislodging. As a further precaution against incomplete fusing, inserts can be tapered so as to resist dislodging, and may have grooves, channels or the like which fill with the molten first metal and thereby form a strong mechanical bond between the insert and the component even where fusing is incomplete.

Care has to be exercised in the choosing of the size of the insert of the second metal since if too large an insert is placed within the first mould the shock of the molten iron entering can cause cracking of the metal of the insert. Conversely, if too small an insert is chosen, the heat of the molten iron can cause partial melting and distortion of the shape of the insert. In any given situation a small amount of experimentation will determine the correct size of the insert between these two extremes.

Components according to the invention are suitable for various end uses, such as among others, moulds for glassware, bottle moulds, parison moulds, neck rings, guide plates, bottoms, baffles, plungers and blow heads.

The invention will be described further, by way of example, with reference to the accompanying drawings, in which.

Figure 1:
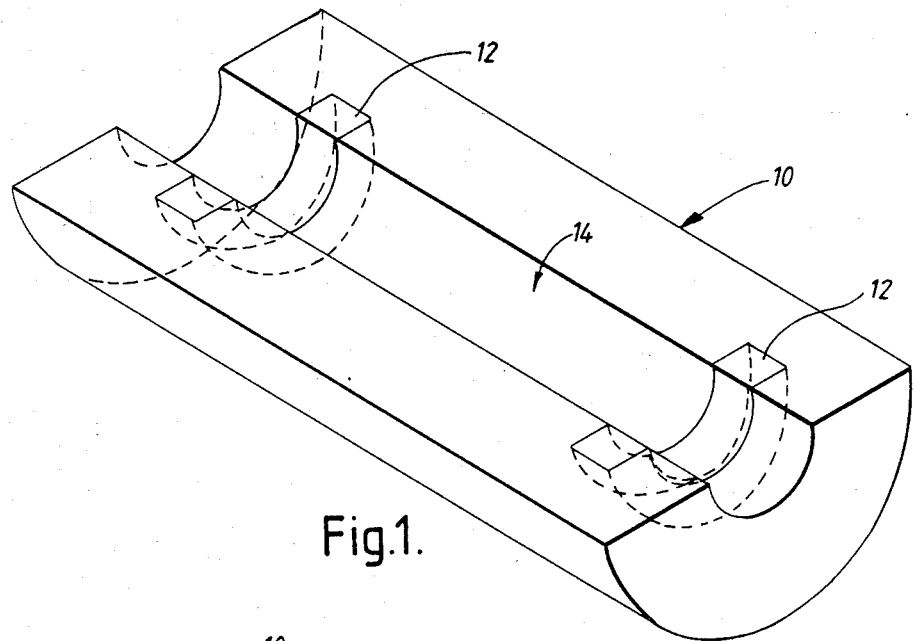
FIG. 1 is a diagrammatic perspective view of half of a component produced according to the invention.

Referring to the drawings, it can be seen in FIG. 1 that a component 10, in this case a mould, for example intended to produce glass bottles, may be formed by casting a first metal, for example, cast iron, about semi-annular inserts 12 of a second metal, for example a nickel cobalt alloy such as those sold under the trade names Colmonoy, Stellite, and the like, in a first mould of compressed refractory particulate material such as sand (not shown in the drawings). Once the casting is cooled the mould cavity 14 may be machined to any desired shape in accordance with the end use of the component, for example, the moulding of glass bottles. The component illustrated in FIG. 1 is of course intended to be used with another like, complementary component, the two together forming a complete mould for the eventual glass article.

Figure 2:
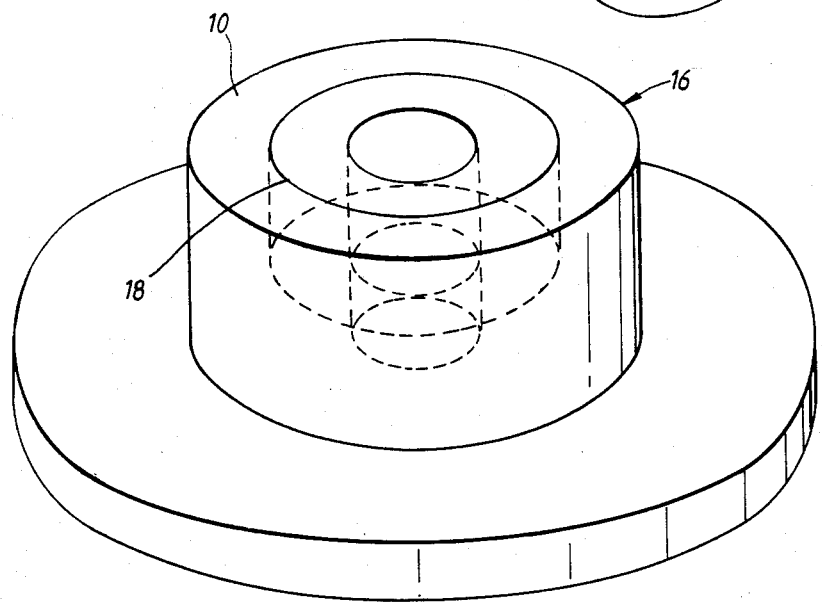
FIG. 2 is a partial perspective view of another component according to the invention.

FIG. 2 illustrates part of a further embodiment of the invention which is a guide plate. As before, the component is produced from cast iron 10, in this case having a full annular insert 18 of a cobalt nickel alloy.

Components produced according to the invention require no deposition welding stage, and only require one machining stage, therefore they may be produced more simply, and hence more economically, than similar components hitherto manufactured.

The shape of the insert will depend on the exact component being produced. In the two embodiments described above, annular and semi-annular inserts have been employed, but other shapes such as plates, discs and so forth may be used as appropriate for a particular component.

Figure 3:
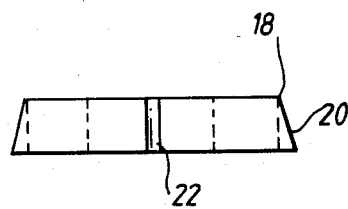
FIG. 3 is a side elevational view of an insert suitable for use with the component of FIG. 2.
Figure 4:
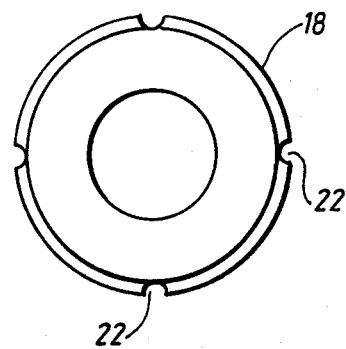
FIG. 4 is a top plan view of the insert of FIG. 3.

Referring now to FIGS. 3 and 4, it can be seen that the annular insert 18 may be tapered, as at 20, so as to resist removal from the guide plate 16. Furthermore, notches 22 are formed in the circumference of the insert 18 which which fill with cast iron in the casting process and hold the insert 18 against rotation. Thus, even if the fusing of the alloy of the insert 18 to the cast iron 10 is incomplete the insert is firmly mechanically held and will resist movement or removal from the finished component 16.

Figure 5:
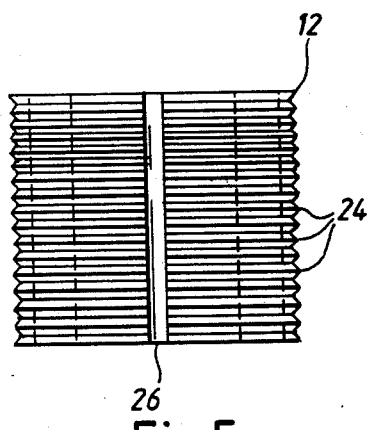
FIG. 5 is a bottom plan view of an insert suitable for use in a component of FIG. 1.
Figure 6:
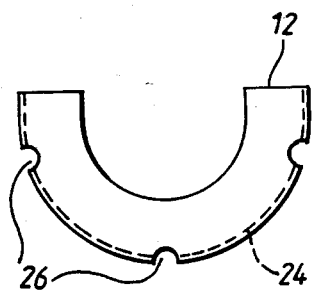
FIG. 6 is an end elevational view of the insert of FIG. 5.

In FIGS. 5 and 6, the semi-annular insert 12 of FIG. 1 is provided on its underside with serrations 24, in some ways resembling a thread but not necessarily being helical. When the component is formed with such an insert 12 the cast iron 10 causes the extremities of the serration, which have a relatively small heat capacity, to heat up very quickly and fuse. Even when incomplete fusion takes place, the serrations 24 form a very good mechanical bond with the cast iron 10. As a further precaution, axially directed grooves 26 are also provided holding the insert 12 against rotation about the longitudinal axis of the mould cavity 14. The insert shown in FIG. 5 is of greater length than that illustrated in FIG. 1 for the following reason. The insert in FIG. 5 may be used where reinforcement is required at the end of a component and the insert illustrated in FIG. 5 will span two adjacent components. After the cast iron 10 is set about the insert the latter is cut through separating the adjacent components. Naturally the pitch of the serrations can be varied, and the grooves 26 could be replaced with projections.

Figure 7:
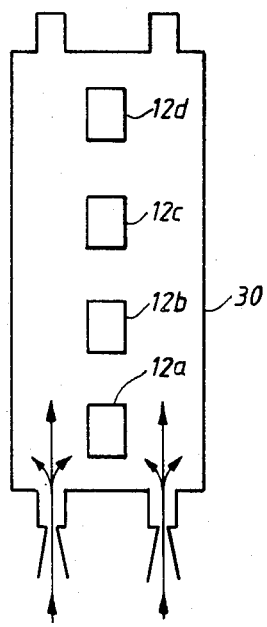
FIGS. 7 and 8 are diagrammatic views of a conventional first mould.
Figure 9:
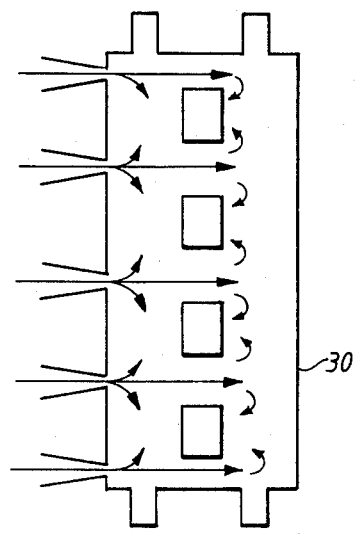
FIGS. 9 and 10 are similar views to FIGS. 7 and 8 of moulds for the process of the invention.

Since the melting point of the preferred nickel cobalt alloy inserts, for example "Colmonoy", is less than the temperature to which the cast iron is heated prior to moulding, if inserts 12a to 12d were placed in a mould 13 as illustrated in FIG. 7, which is a conventional mould configuration, and the cast iron led in as indicated by the arrows, then the insert 12a would tend to melt away completely, and the insert 12b would be very severely distorted. By the time the cast iron had reached the far end of the mould the temperature would have dropped very possibly to a level at which it would cause incomplete adhesion to the insert 12d. By arranging the inlets as indicated in FIG. 9, the desired partial fusing of the inserts 12 can be achieved without excessive melting or distortion.

Figure 8:
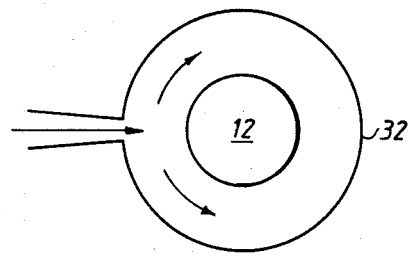
Figure 10:
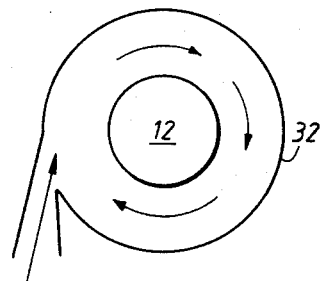

Similarly, FIG. 8 illustrates a conventional annular mould 32 having the insert 12 centrally thereof. The conventional flow path would direct the incoming molten iron directly at one side of the insert 12 thus melting it away. Whereas the modified mould of FIG. 10 directs the incoming flow tangentially resulting in fusion of the insert to the cast iron without excessive distortion or melting away. By this means, a component can be produced having an insert of a metal having a lower melting point than the temperature of the incoming cast iron.

I claim:

1. A glass mold component which comprises a casting of a first metal having an insert therein to provide reinforcement, the insert being of a second, reinforcing metal whose melting point is below the casting temperature of the first metal, and the component having a machined surface of the desired final shape along both the cast first metal and the insert of the second metal which is exposed to provide reinforcement in molding of glass.

2. A glass mold component as in claim 1 in which the casting metal is cast iron and the insert is a nickel cobalt alloy.

3. A glass mold component as in claim 1 or 2 in which the insert is tapered.

4. A glass mold component as in claim 1 or 2 in which the insert is provided with serrations.

5. A glass mold component as in claim 1 or 2 in which the insert is provided with ridges.

* * * * *